United States Patent Office 2,978,298
Patented Apr. 4, 1961

2,978,298

PROCESS FOR PRODUCING HYDROPHOBIC AEROGELS

John W. Wetzel and Kenneth B. Goldblum, Pittsfield, Mass., assignors to General Electric Company, a corporation of New York No Drawing. Filed Sept. 4, 1956, Ser. No. 607,592

4 Claims. (Cl. 23—182)

This invention relates to the production of hydrophobic silica aerogels. More particularly, this invention relates to the production of novel silica aerogels which are hydrophobic as formed and which do not depend upon the presence of silicones for their hydrophobic properties.

Hydrophobic aerogels which are composed of both silica and silicones are known. One such aerogel is described in U.S. Patent 2,441,422 to Krieble et al., assigned to the assignee of the present invention. It has also been known that silica aerogels may be rendered waterproof or water-repellent by treating the aerogels with silicone products.

Silica aerogels which are not hydrophobic have been prepared by suitably mixing a solution of water glass and a solution of an appropriate salt or acid. On standing, such sols form gels from which the liquid media may be removed to form porous dry or substantially dry gels. When no precautions are taken to preserve the original gel structure during the removal of the liquid phase, shrinkage takes place and the products are called xerogels. However, if the washed gel is confined in a pressure vessel and then heated until the liquid and the gel has reached a temperature at which the surface tension of the liquid is so small as to produce no substantial shrinkage of the gel when the vapor is allowed to escape and the vapor is then gradually released from the pressure vessel, the skeleton structure of the dried gel is preserved approximately in its original porous state. The term "aerogel" has been applied to this highly porous type of gel which is described, for example, in U.S. Patent 2,093,454 to Samuel S. Kistler. According to the Kistler patent, these aerogels are further distinguished from xerogels by the fact that when they are treated with water and subsequently dried in the usual manner, that is below the critical pressure and temperature, they shrink during the drying operation and are converted to xerogels. It is thus apparent that the silica aerogels produced by this method can be wetted with water. One means of rendering the aerogels waterproof or water-repellent is by treating them with hydrophobic agents. This, however, involves additional processing and, of course, additional expense.

It is, therefore, a primary object of this invention to produce a silica aerogel which is hydrophobic, as formed, without further treatment thereof.

It is a further object of this invention to produce silica aerogels with improved hydrophobic properties, which are free of salt contamination and have an improved thickening action when used as fillers for grease.

It is still an additional object of this invention to produce the aforementioned aerogels in a substantially more economical manner than heretofore known.

It has unexpectedly been discovered that by the substantially complete removal of water from the sol, prior to autoclaving, a hydrophorib aerogel will result from the high pressure and temperature solvent removal without the presence in the aerogel of any silicone. The process of this invention enables a vastly more simplified and economical method of producing hydrophobic silica aerogels to be achieved and at the same time results in a product with many improved properties.

Briefly stated, the process of this invention involves the steps of (1) forming an aqueous sol from an alkali-metal silicate, (2) removing the water from the aqueous sol by distilling the water therefrom with an azeotrope comprising an alcohol having a critical temperature below 300° C., said azeotropic distillation being carried out until substantially all the water has been removed from the aqueous sol, and (3) removing the alcohol at a temperature and presure of at least the critical temperature and pressure of the alcohol.

The azeotropic systems useful in the practice of this invention may be either a binary or a ternary system. Thus, the azeotrope may be composed of water and an alcohol having a critical temperature below 300° C., such as ethyl, n-propyl, iso-propyl, n-butyl or other aliphatic monohydric alcohols. Suitable ternary azeotrops include water, the aforesaid alcohols, and in addition either benzene, diethoxy methane or n-propyl acetate. In general it has been found, however, that best results are achieved by the use of a binary system comprising water and one of the aforesaid aliphatic monohydric alcohols. A preferred azeotropic system is the binary of water and either ethanol or propanol. The latter alcohols are preferred paticularly because they have been found to be a desirable solvent with which to replace water.

The sols may be prepared from the alkali metal silicate in various ways. For example, solutions of water glass may be mixed with an acid which will liberate silicic acid in colloidal form. Any acid or salt or ion exchange body suitable for the preparation of silica sols and gels may be employed to form the colloidal solution. Subsequent to the formation of this aqueous sol, the alcohol or other ingredients of the azeotropic system are added. The sol, including the additional azeotropic solvents, are then distilled to remove the water present in the system while adding additional non-aqueous solvent to keep the volume constant. The resulting non-aqueous sol is then placed in a pressure vessel and heated to the critical temperature. The temperatures and the pressures employed are generally a function of the alcohol used in the azeotropic system.

Copending application, Serial No. 607,591 of Kenneth B. Goldblum, now U.S. Patent 2,945,817, filed of even date with this application and assigned to the same assignee as the present invention, is directed toward a process for azeotropically distilling water from a silica-silicone sol prior to autoclaving and to the formation of an improved silica-silicone aerogel. As there pointed out, the process of azeotropic distillation not only effects substantial economy in the process af producing the silica-silicone aerogel there claimed, but also results in a product of improved properties. In producing the pure silica aerogels of this invention, the same advantages are derived from the azeotropic distillation of the water prior to the step of autoclaving the sol to remove the solvent, and as there pointed out the temperatures and pressures used as a result of prior azeotropic distillation will be lower than those employed with aqueous sols or gels. This invention differs from that of the aforesaid application Serial No. 607,591 in that hydrophobic aerogels are produced with no silicones present in the aerogel.

In order that those skilled in the art may better understand how the present invention may be carried into effect, the following illustrative example is given. All percentages are by weight.

*Example*

An aqueous solution of 286 grams of sodium silicate, containing 29.4 percent $SiO_2$, was added at the rate of 10 ml./minute to a vigorously stirred slurry of 500 grams of Amberlite IR 120 hydrogen ion exchange resin (acidity—1.8 milliequivalents/gram) and 387 ml. of water. (The hydrogen ion exchange resin could have been replaced by a mineral acid such as HCl. The exchange resin functions both as an acidifying agent and for removal of the salt forming sodium ions.) When 90 percent of the silicate had been added, 200 ml. of n-propanol was put into the reaction mixture. When the remainder of the silicate had been added, stirring was stopped and the sol decanted from the ion-exchange resin. The aforesaid resin was washed with three portions of n-propanol making a total volume of 1565 ml. of propanol in the final sol. The 70 percent propanol sol (i.e., 30 percent water) formed in the above manner was transferred to a Claisen distilling flask and stirred while a water-propanol azeotrope was removed. The volume of the sol was kept constant by adding propanol to the distilling flask at a rate equal to the rate of distillation. After 3.6 liters of distillate had been removed, the vapor temperature had increased from 86° to 92.5° C. The distillation was stopped when 4.4 liters of distillate and a vapor temperature of 94° C. were reached. The sol was stored at 40° C. overnight and then charged to a glass-lined pressure reactor. The charge was a thick, opaque homogeneous mass which did not contain any granular gel. The pressure reactor was operated at 275°–300° C. and 1050 p.s.i.g. with an overall vent rate of 20 ml./minute. The bomb was opened immediately and allowed to cool in position. The fluffy aerogel product remaining behind in the pressure reactor amounted to 87.5 grams. This represented a 99 percent yield based on the 1761 grams of sol charged (4.98 percent solids).

In order to test the hydrophobicity of the aerogels resulting from the above example, a 0.25 gram sample in 15 ml. of water was shaken 5 minutes as 0.5 milliliter increments of methanol were added. The volume of methanol necessary to reduce the amount of aerogel floating to about 5 percent was taken as a measure of the hydrophobicity. The methanol wettability was checked before and after heat treatment.

The product from the above example was then checked for bulk density. In order to offer comparative data, the results of the above measurements are shown in the following table as Test A together with the results of similar measurements with a silica-silicone areogel derived from a 100 percent propanol sol and identified as Test B. The aerogel of Test B was prepared from 20 percent sodium methylsiliconate and 80 percent sodium silicate in accordance with Example 1 of copending application Serial No. 607,591. This aerogel was prepared from a 100 percent propanol sol and autoclaved to a final temperature of 275° C.

| Test | Percent Silicone | Density, g./ml. | Methanol Wettability | |
|---|---|---|---|---|
| | | | Orig. Prod., ml. | After Heat Treatment,[1] ml. |
| A | 0 | .045 | 4.5 | 4.0 |
| B | 20 | .051 | 3.5 | 5.0 |

[1] The heat treatment was conducted for five hours at a temperature of 150° C.

The data above show that a 100 percent silica aerogel produced in accordance with this invention is equivalent in hydrophobicity to aerogels containing both silica and silicone and prepared from a 100 percent alcoholic solution in accordance with the above mentioned copending application Serial No. 607,591.

Although hydrogen ion exchange resins were used in the above example, mineral acids could have been used to form the colloidal solution of silicic and siliconic acids. The ability to use mineral acids in place of ion exchange resins and still produce a salt-free product is an important distinction over prior methods, for in commercial practice, ion exchange resins are more costly from a material and from a processing point of view. In addition, ion exchange resins require regeneration. On the other hand, when mineral acids, such as hydrochloric or sulfuric acid, are used prior to azeotropic distillation, the inorganic salts formed become less and less soluble as water is removed. After essentially all of the water is removed, the salts have precipitated and may be easily removed by decantation, centrifigation or other well known means. Autoclaving the resulting alcosol thus gives an essentially salt-free aerogel.

It has been found that the use of hydrophobic silica aerogels produced in accordance with the process of this invention from 100 percent alcoholic sols can be used to produce lubricants having properties which are superior to those made from silica-silicone aerogels produced from less than a 100 percent alcoholic sol, i.e. in which the water had not been azeotropically distilled away. In order to illustrate these results, lubricating greases were prepared by mixing lubricating fluids and the aerogels of this invention until a stiff paste was formed. These pastes were then rolled on a three-roll mill. The consistency was adjusted by adding filler and oil as needed. The final formulation was milled three times before testing the stiffness of the resulting greases with a micropenetrometer. Greases were prepared, thickened with both an aerogel made in accordance with the process of this invention and from an aerogel which was prepared from a less than 100 percent alcohol sol. In addition, illustrating comparative results, the results of a third set of greases thickened with an aerogel produced in accordance with the process of copending application, Serial No. 607,591 is also tabulated below. Filler A below is the aerogel produced by Example 1, of said copending application, autoclaved to a final temperature of 305° C. This aerogel contained 20 percent silicone and was prepared from a 100 percent alcoholic sol. Filler B was made with the same relative proportions of silica and silicone, but the sol contained 30 percent water at the time of autoclaving. Filler C was prepared from a 100 percent alcohol sol of 100 percent silica in accordance with Example 1 of this application. The results were as follows:

| Filler | Density, g./ml. | Lubricating Fluids | | | | | |
|---|---|---|---|---|---|---|---|
| | | Heavy Turbine Oil | | Silicone Oil [1] | | Silicone Oil [2] | |
| | | Percent Filler | Micro-penetrometer | Percent Filler | Micro-penetrometer | Percent Filler | Micro-penetrometer |
| A | .064 | 4.0 | 177 | 4.0 | 190 | 4.1 | 193 |
| B | .032 | 6.3 | 155 | 7.4 | 175 | 7.4 | 180 |
| C | .045 | 5.5 | 166 | 5.3 | 187 | 6.3 | 200 |

[1] Methyl phenylpolysiloxane.
[2] Methylpolysiloxane.

A micropenetrometer tests the tendency of a grease to deform under a load. The above table indicates that Filler C achieved approximately the same micropenetrometer reading as Filler B (water not removed from sol) with a smaller percentage of filler. The above data shows that the use of silica aerogels produced in accordance with the process of this invention are as suitable as silica-silicone aerogels produced in accordance with application Serial No. 607,591 and are superior to silica-silicone aerogels produced by prior techniques.

In addition to their uses as thickening agents in accordance with the above, aerogels produced in accordance with this invention can also be used as reinforcing agents for rubbers including silicone rubbers, as core plate enamel fillers, brake band fillers, wood lacquer, flatting agents, photographic film, thermal insulation, fillers for vinyl resins and for other known applications of silica gels such as catalyst or catalyst carriers.

What we claim as new and desire to secure by Letters Patent of the United States is:

1. A process for preparing an aerogel which comprises the following sequential steps, (1) forming by precipitation an aqueous sol from an alkali-metal silicate, (2) removing the water from the aqueous sol by distilling the water therefrom with an azeotrope comprising an aliphatic monohydric-alchol having a critical temperature below 300° C. while maintaining the volume of solvent constant by the addition of one of said aliphatic monohydric alcohols, said azeotropic distillation being carried out until substantially all the water has been removed from the aqueous sol, and (3) removing by evaporation the remaining alcohol at a temperature and pressure of at least the critical temperature and pressure of the alcohol.

2. A process for preparing an aerogel which comprises the following sequential steps, (1) acidifying an aqueous solution of sodium silicate to form an aqueous sol, (2) removing the water from the aqueous sol by distilling the water therefrom with an azeotrope comprising an alcohol selected from the group consisting of ethanol and propanol while maintaining the volume of solvent constant by the addition of one of said alcohols to produce a substantially water-free alcoholic sol, and (3) removing by evaporation the remaining alcoholic solvent at a temperature of at least the critical temperature of the solvent and at a pressure of at least the critical pressure of the solvent.

3. A process for preparing an aerogel which comprises the following sequential steps, (1) acidifying an aqueous solution of sodium silicate to form an aqueous sol, (2) removing the water from the aqueous sol by distilling the water therefrom with an azeotrope comprising ethanol while maintaining the volume of solvent constant by the addition of additional ethanol to produce a substantially water-free alcoholic sol, and (3) removing by evaporation the remaining alcoholic solvent at a temperature of at least the critical temperature of the solvent and at a pressure of at least the critical pressure of the solvent.

4. A process for preparing an aerogel which comprises the following sequential steps, (1) acidifying an aqueous solution of sodium silicate to form an aqueous sol, (2) removing the water from the aqueous sol by distilling the water therefrom with an azeotrope comprising propanol while maintaining the volume of solvent constant by the addition of additional propanol to produce a substantially water-free alcoholic sol, and (3) removing by evaporation the remaining alcoholic solvent at a temperature of at least the critical temperature of the solvent and at a pressure of at least the critical pressure of the solvent.

References Cited in the file of this patent

UNITED STATES PATENTS

| | | |
|---|---|---|
| 2,093,454 | Kistler | Sept. 21, 1937 |
| 2,188,007 | Kistler | Jan. 23, 1940 |
| 2,249,767 | Kistler | July 22, 1941 |
| 2,285,449 | Marshall | June 9, 1942 |
| 2,386,337 | Moyer | Oct. 9, 1945 |
| 2,441,423 | Elliott et al. | May 11, 1948 |
| 2,731,326 | Alexander et al. | Jan. 17, 1956 |
| 2,945,817 | Goldblum | July 19, 1960 |

FOREIGN PATENTS

| | | |
|---|---|---|
| 685,146 | Great Britain | Dec. 31, 1952 |

OTHER REFERENCES

Perry: Chemical Engineers' Handbook, 3rd ed., 1950, McGraw-Hill, N.Y., pages 630, 631.